July 4, 1950     F. BLESSINGER, JR     2,513,783
TRACTOR HITCH

Filed Feb. 17, 1949     2 Sheets-Sheet 1

INVENTOR.
Frank Blessinger Jr.
BY
W. G. & S. M. Stewart
ATTORNEY

July 4, 1950 F. BLESSINGER, JR 2,513,783
TRACTOR HITCH

Filed Feb. 17, 1949 2 Sheets-Sheet 2

INVENTOR.
Frank Blessinger Jr.
BY
W. F. S. M. Stewart
ATTORNEYS

Patented July 4, 1950

2,513,783

UNITED STATES PATENT OFFICE 2,513,783

TRACTOR HITCH

Frank Blessinger, Jr., Boyertown, Pa.

Application February 17, 1949, Serial No. 76,951

4 Claims. (Cl. 97—47)

1

This invention relates generally to tractor hitches for coupling a farm implement, such as a plough, to a tractor, and, more particularly, to a hitch adjusting mechanism for a tractor provided with a hydraulically operated hitch of the type which is commonly referred to as a "Ferguson" (or "Ford-Ferguson") system, which adjusting mechanism is especially useful for ploughing on a hillside.

When a tractor including the above-mentioned type of hitch is employed to draw a gang plow on a hillside, there will be a tendency for the plow to side slip downhill because of the pivotal mounting of the hitch and thereby not provide a full furrow.

An object of the present invention is to provide, on a hitch of the above-mentioned type, an adjusting mechanism for adjustably moving the hitch laterally to overcome the tendency of the implement to side slip relative the tractor and thereby assure, in the case of a gang plow, that each plow element will develop a full furrow.

A more specific object of this invention is to provide means for adjustably shifting laterally to the proper position a plow secured to the draw bar of the above-mentioned type of hitch so as to function on the sides of hills in a manner so as to properly turn over spaced equal furrows, and including a shifting member which is so shaped as to prevent lateral collision with the rods connecting the draw bar to the tractor when the draw bar is in the lifted position.

A still further object of this invention is to provide in a Ford (or Ford-Ferguson) implement tractor an improved gang plow hitch including novel means to shift it laterally to the desired position in case it is desired to plow a hillside, which means is controllable by an operating handle which is conveniently positioned near the side of the operator's seat, instead of behind the seat, therefore avoiding the necessity of turning around of the operator and reaching as is required in operating present types of tractor hitches.

Other objects and advantages of the present invention will become apparent from a study of the following specification taken with the accompanying drawings wherein.

Figure 1:
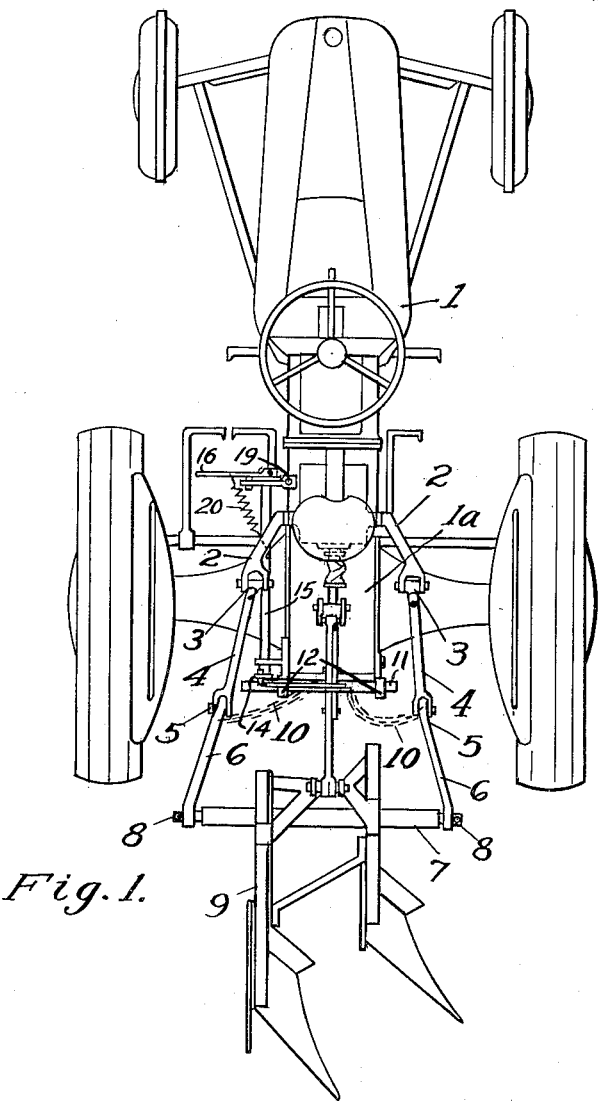
Fig. 1 is a top plan view of a tractor having connected thereto a hitch forming part of a Ford (or Ford-Ferguson) hydraulically operated system and showing an attachment embodying the principles of the present invention for laterally shifting an implement, such as a gang plow as shown, for hillside plowing.
Figure 2:
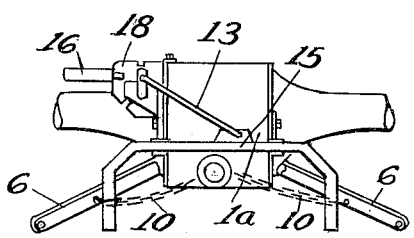
Fig. 2 is a fragmentary rear elevational view
Figure 3:
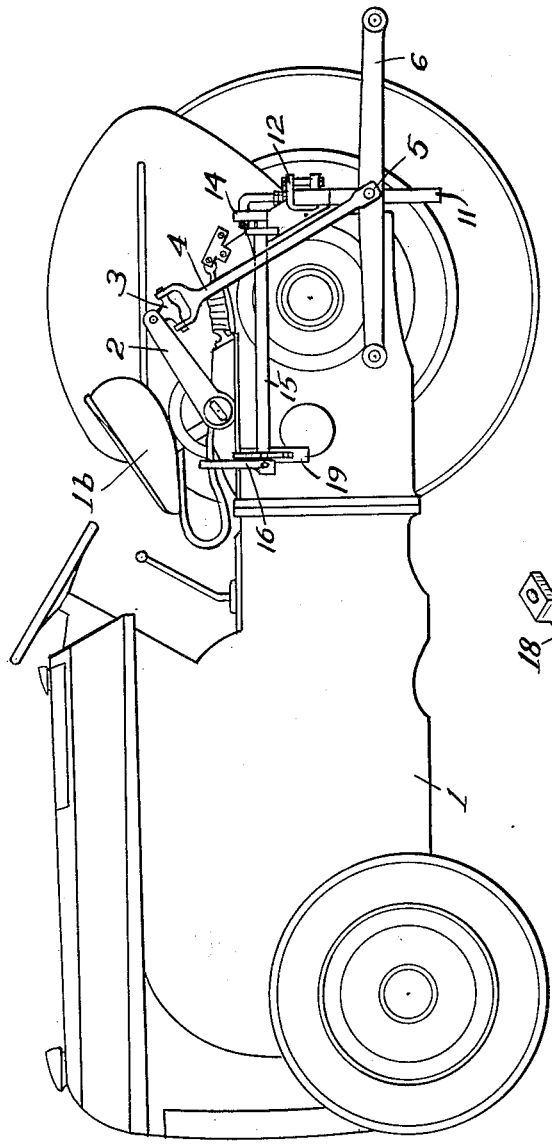
Figure 4:
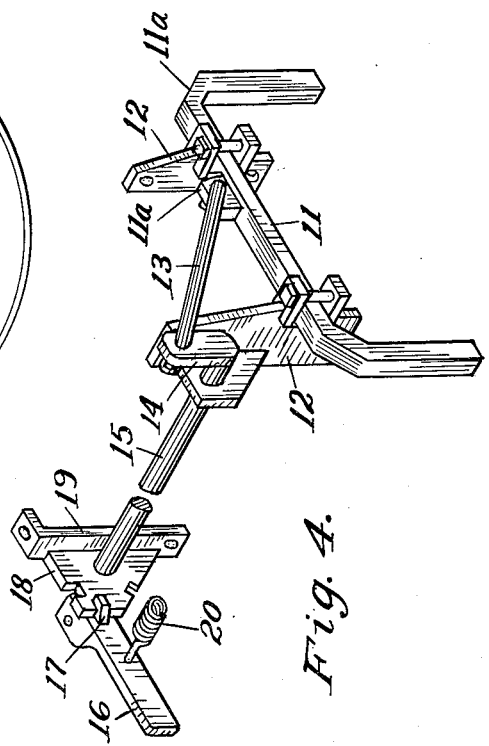

2 showing more clearly the inverted substantially U-shaped lateral shifting element;

Fig. 3 is a side elevational view with one of the rear wheels removed of the tractor shown in Fig. 1; and Fig. 4 is a perspective view of the lateral shifting element embodying the features of the present invention and showing the complete handle controlled operating system therefor.

Referring more particularly to the figures, numeral 1 denotes a tractor of any suitable type, for example, a Ford tractor, having a rear axle housing 1a. The tractor is equipped with hydraulically actuated arms 2, 2 which are connected by universal coupling 3, 3 to adjustable connectors 4, 4 which, in turn, are pivotally secured at 5, 5 to the pivotally mounted draw bar carrying arms 6, 6. Numeral 7 denotes a conventional draw bar having pintles 8, 8 at the ends thereof which extend through holes formed in the outer end portions of arms 6. Secured to draw bar 7 is any suitable farm implement, such as a gang plow 9. By application of hydraulic pressure, arms 2 may be rotated so as to lift the hitch comprising elements 4, 6, and 7 together with the gang plow 9 attached thereto. Chains 10, 10 connect arms 6, 6 to the rear axle housing so as to limit sidewise movement of the hitch. The structure described so far is conventional in the art.

The present invention is directed specifically to means for laterally and adjustably shifting the above-described hitch, which means is best illustrated in Fig. 4 and comprises an inverted substantially U-shaped shifting member 11 which is connected in a manner so as to allow convenient operation by the operator. More specifically, member 11 is slidably mounted on brackets 12, 12 which are rigidly secured to rear axle housing 1a. Pivotally secured to a lug 11a extending from the top central portion of member 11 is one end of a laterally extending link 13. The other end of link 13 is bent and extends through an aperture formed in a crank arm 14. The crank arm is connected to one end of a shaft 15 extending longitudinally of the tractor to a convenient position near the side of the operator's seat 1b.

The forward end of shaft 15 has pivotally mounted thereon an operating handle or lever 16 having a pin or lug 17 thereon adapted to be engaged in one of the notches of a quadrant plate 18. The plate 18 is rigidly secured to a bracket 19 which is fixed to the differential housing or other suitable part of the tractor. A spring 20 is provided having one end connected to handle 16 and the other secured to the differential housing.

In operation when the tractor is operating along a hillside, for example, and there is a tendency for the gang plow 9 to drift downhill, such drifting may be counteracted by pulling handle 19 forwardly against the action of spring 20 to withdraw pin 17 from a given notch and thereafter turning handle 16 about the axis of shaft 15 to re-set the pin in another selected notch or recess, thereby rotating shaft 15 and crank arm 14 which, in turn, effect lateral sliding movement of the horizontally extending portion of member 11 within projecting portions of brackets 12. Thus one of the downwardly extending leg portions of member 11 will abut one of the draw bar carrying arms 6 of the hitch and thereby restrain the hitch assembly from lateral movement downwardly of the hillside. Of course, the lateral adjustment may be employed even for plowing on level ground. By virtue of the pivotal support of the hitch, any farm implement connected therewith is capable of proper tracking with the tractor when sharp or close turns are to be negotiated.

After the hydraulically actuated arms 2 are operated so as to lift the hitch and plow, there would be a tendency of the corners of member 11 to drift sidewise and collide intermittently with arms 6 of the hitch if member 11 had sharp corners. For this reason, the corners 11a of such member are beveled so as to provide a clearance and thus allow limited lateral movement of arms 6 when the hitch is in the lifted position, thereby avoiding the possibility of collision with the corners.

Thus it will be seen that I have provided a novel, highly useful, as well as relatively simple and inexpensive attachment for a Ford (or Ford-Ferguson) type of tractor hitch which enables lateral adjustment of the hitch so as to make it possible to plow along a hillside and obtain properly spaced, equal and full furrows, which attachment is of a construction to prevent collision with parts of the hitch when the hitch is lifted; furthermore, I have provided an attachment which may be laterally shifted by an operating handle disposed in a convenient position near the side of the operator's seat so as to prevent the necessity of turning of the operator to operate the handle.

While I have illustrated and described a certain specific embodiment of my invention, it will be apparent that this is by way of illustration only, and that various changes and modifications may be made within the contemplation of my invention and within the scope of the following claims.

I claim:

1. In combination, a tractor having an axle housing, a hitch pivotally supported on the tractor comprising a pair of rearwardly diverging arms pivotally connected at their forward ends to said axle housing, a draw bar connected to the ends of said arms, a pair of hydraulically operative arms connected to said hitch arms to effect lifting thereof, and means for laterally and adjustably shifting said hitch, comprising an inverted, substantially U-shaped member, the depending legs of which are adapted to engage said hitch arms, operating means extending from said inverted, substantially U-shaped member to a position alongside the driver's seat of said tractor, and an operating handle mounted at said position to afford easy access thereto by the operator.

2. In combination with a tractor, a hitch including rearwardly diverging arms connected together by a draw bar, a plow coupled to said draw bar, and means for effecting lateral adjustment of said hitch comprising an inverted substantially U-shaped member slidably mounted on said tractor, an arm having one end pivotally connected to said member, an operating shaft having a crank arm at one end pivotally connected to the other end of said last-mentioned arm, an operating handle connected to the other end of said shaft and disposed alongside the driver's seat of said tractor, said handle having a pin thereon, a notched quadrant, and spring means for biasing said handle and its pin into selective engagement with the notches of said quadrant, turning of said handle being effective to cause lateral shifting of said inverted substantially U-shaped member so that the depending legs thereof will abut against and adjust the lateral position of said hitch arms.

3. Apparatus recited in the next previous claim wherein said inverted substantially U-shaped member has beveled corners to prevent collision with said hitch arms.

4. In an attachment for a hydraulically operable hitch of the Ford-Ferguson type having outwardly diverging hitch arms pivotally attachable to the axle housing of a tractor, a draw bar connecting the free ends of said arms for carrying a farm implement and hydraulically operative arms for lifting said hitch, a pair of bracket members for attachment to the tractor, an inverted, substantially U-shaped member laterally slidable within said bracket members, a connecting arm having one end pivotally connected to the horizontal portion of said inverted, substantially U-shaped member, an operating shaft adapted to extend longitudinally of the tractor and having at one end a crank arm which is pivotally mounted to the other end of the said connecting arm, an operating handle pivotally mounted to the other end of said shaft to permit arcuate movement of the handle in the general direction of the shaft, a spring having one end connected to said handle and the other end adapted to be connected to the tractor, a pin integrally formed with said handle, a notched quadrant serving as a journal for said other end of said shaft whereby pulling of said handle against the action of said spring will release said pin from one of said notches and turning of the handle and rotation of said shaft will move the pin into a different selected notch, thereby laterally shifting said inverted, substantially U-shaped member to cause the depending arms thereof to abut said hitch arms and thereby adjustably position the hitch in a given lateral position so as to prevent sidewise drift of the hitch when drawn along a hillside.

FRANK BLESSINGER, Jr.

REFERENCES CITED

The following references are of record in the file of this patent:

UNITED STATES PATENTS

| Number | Name | Date |
| --- | --- | --- |
| 2,338,334 | Kastenschmidt | Jan. 5, 1944 |
| 2,352,276 | Lindgren | June 27, 1944 |